Oct. 27, 1964  B. O. KAPPELMANN  3,154,031
WATERING APPARATUS FOR PRECISION SEED PLANTING
Filed June 6, 1963  3 Sheets-Sheet 1
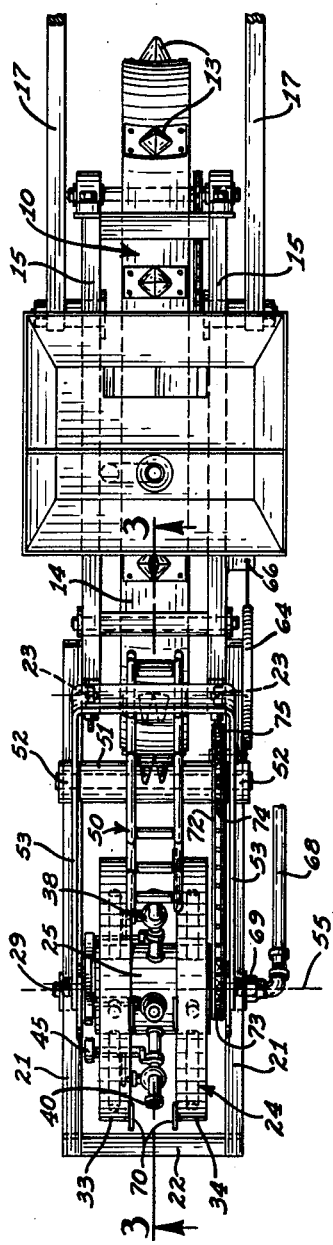
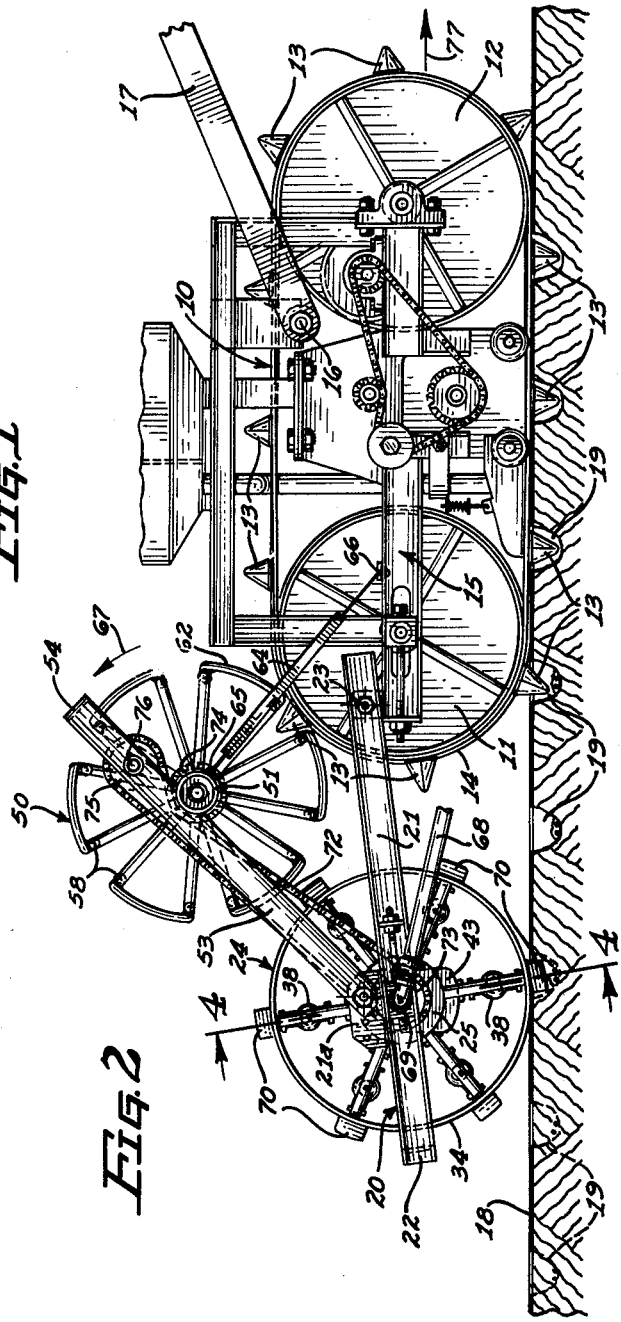
INVENTOR.
BENJAMIN O. KAPPELMANN.
BY
Willard S. Grow
ATTORNEY.

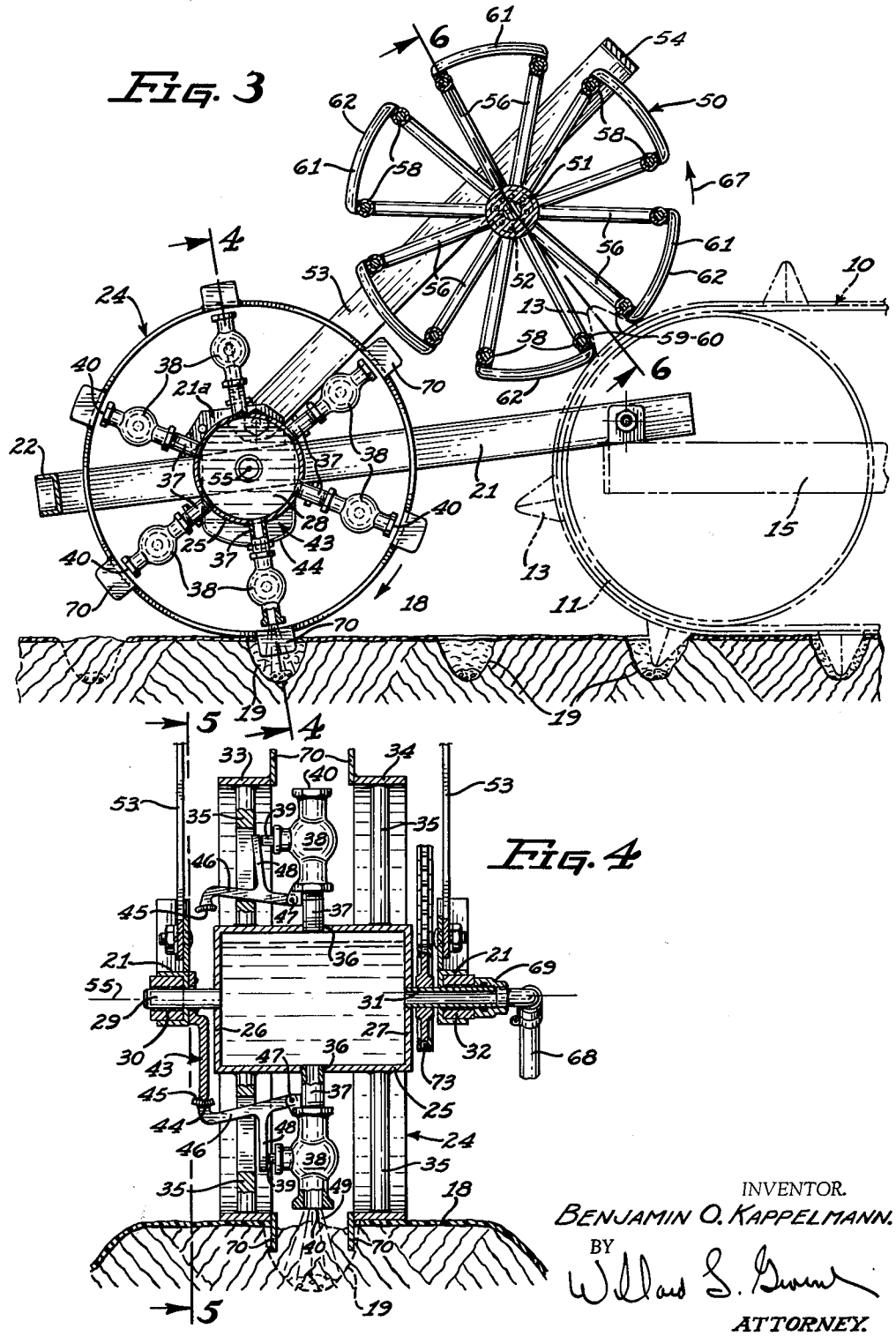

Oct. 27, 1964   B. O. KAPPELMANN   3,154,031
WATERING APPARATUS FOR PRECISION SEED PLANTING
Filed June 6, 1963   3 Sheets-Sheet 3
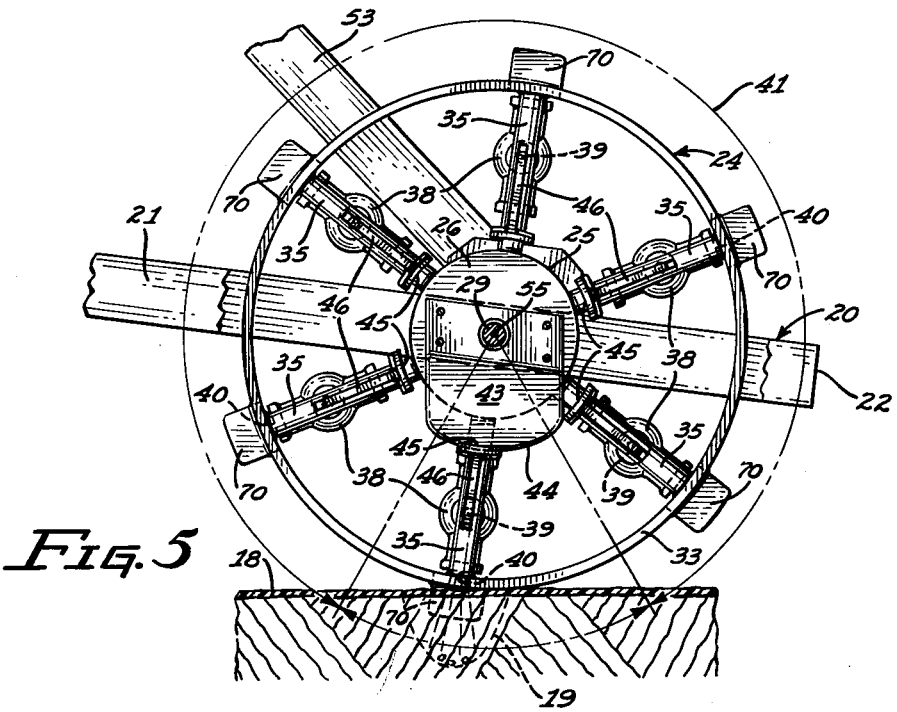
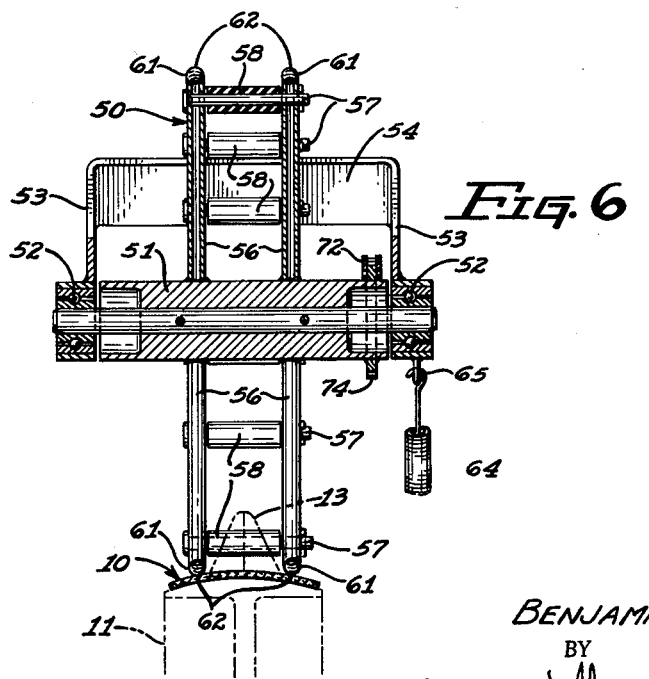
INVENTOR.
BENJAMIN O. KAPPELMANN.
BY
Willard S. Grout
ATTORNEY.

United States Patent Office 3,154,031
Patented Oct. 27, 1964

3,154,031
WATERING APPARATUS FOR PRECISION
SEED PLANTING
Benjamin O. Kappelmann, Phoenix, Ariz., assignor to Precision Agricultural Machinery Company, Phoenix, Ariz., a corporation of Arizona
Filed June 6, 1963, Ser. No. 285,977
3 Claims. (Cl. 111—7)

This invention pertains to watering devices for machine planted seeds and is particularly directed to a watering apparatus for precision seed planters.

One of the objects of this invention is to provide a supply of water to the seed, fertilizer and mulch at the time it is planted in the ground in order to promote rapid and efficient germination of growth of the seeding plants.

Another object of this invention is to provide a watering apparatus adapted to distribute a measured quantity of water to the seed, fertilizer and mulch as it is planted at spaced intervals along a plant row.

A further object is to provide a watering apparatus particularly adapted to operate in timed relationship with a precision seed planter to provide desired amounts of water in each hole in which the seed, fertilizer and mulch has been deposited by the precision planter and to deposit or cave in the sides of the planting hole as the watering operation is completed.

Further features and advantages of this invention will appear from a detailed description of the drawings in which:

FIG. 1 is a plan view of a watering apparatus for a precision seed planter incorporating the features of this invention.

FIG. 2 is a right hand side elevation of the apparatus shown in FIG. 1.

FIG. 3 is an enlarged sectional view on the line 3—3 of FIG. 1.

FIG. 4 is a sectional view on the line 4—4 in FIG. 1.

FIG. 5 is a sectional view on the line 5—5 in FIG. 4.

FIG. 6 is a sectional view on the line 6—6 of FIG. 3.

As an example of one embodiment of this invention, there is shown a watering apparatus particularly adapted for use with a precision planter such as shown in co-pending applications Serial Number 207,114, filed July 2, 1962 and Serial Number 269,660, filed April 1, 1963 in which the essential elements comprise an endless flat belt 10 operating over a convex pulley 11 and a concave pulley 12 and having a series of planting fingers 13 extending outwardly from the outer face 14 of the belt 10. The pulleys 11 and 12 are suitably journaled on a frame 15 which is pivotally connected at 16 to the usual towing and lifting arms 17 of a tractor, not shown. As the precision planter described is towed along the plant row ground surface 18 the planting fingers 13 form longitudinally spaced planting cavities 19 in which the planting fingers, and associated apparatus not shown, deposits the seed, fertilizer and mulch. If water is added to the seed and materials in the planting cavities prior to crumpling the sides of the cavities to cover over the planted material with soil, germination and subsequent growth of the seedlings is very greatly speeded up and little plant loss results.

To this end there is provided a watering apparatus operating in synchronism with the aforementioned precision seed planter comprising a frame indicated generally at 20 comprising the side arms 21 which are tied together at their rear ends by the integrally connected tie bar 22. The front ends of the arms 21 are pivotally mounted on suitable pins 23 carried on the rear ends of the frame members 15 of the precision planter above described.

Referring particularly to FIGS. 3, 4 and 5, the water distributing wheel indicated generally at 24 comprises a hollow hub 25 forming with its closed ends 26 and 27 a closed water manifold compartment 28. A shaft 29 is fixed to the end 26 and is journaled in a suitable bearing 30 carried in the left hand side frame member 21, FIG. 1. A hollow shaft 31 is fixed to the other end 27 and is journaled in a suitable bearing 32 carried in the right hand side frame member 21. Axially spaced ground surface engaging rims 33 and 34 are rigidly connected to the hub 25 by suitable spokes 35.

Between the rims 33 and 34 are a plurality of radially disposed circumferentially spaced pipes 37 threaded at 36 into the hub 25 and in communication with the water manifold compartment 28. Connected to the outer ends of the pipes 37 are the normally closed shut-off valves 38 having inwardly depressible operating plungers 39 which when pushed and held inwardly, opens the valve so that water is discharged at the outer discharge end 40 of the valves 38. The valves 38 are normally closed in the upper portion of wheel rotation 41 but are caused to open automatically during a segment of lower rotation 42 of the wheel 24 by a cam 43 which is suitably fixed to the left hand side arm 21 and has a cam surface 44 which slidingly engages the cam pads 45 fixed to the outer ends of the actuating levers 46 pivotally mounted on a pin 47 carried by the valve 38 and having an integral actuating lug 48 engaging the operating plunger of the valve 38. As the wheel 24 rotates, the cam pads 45 ride up on the radially extended cam surface 44 of the cam 43 to actuate the actuating lever 46 to open a valve as it swings down through the lower segment 42 of wheel rotation to discharge water 49 at the discharge end 40 into a planting cavity 19.

In order that the discharge ends 40 of the valve 38 be always properly positioned with the respective planting cavity 19 to be charged with water, there is provided a timing wheel indicated generally at 50, FIGS. 3 and 6, comprising a shaft 51 journaled in suitable bearings 52 carried on the timer frame arms 53. The outer upper ends of the arms 53 are rigidly connected together by a cross bar 54 while the inner lower ends of the arms 53 are pivotally mounted on brackets 21a secured to the frame side arms 21 to rock substantially about the axis 55 of rotation of the water distributing wheel 24.

The timing wheel 50 includes a series of radially disposed circumferentially spaced pairs of spokes 56 rigidly fixed at their inner ends to shaft 51. Across the outer portions of axially spaced pairs of spokes 56 are the contact roller pins 57 upon which are journaled suitable planting finger contact rollers 58 which engages each side 59 and 60 of the planting fingers 13, FIG. 3. Fixed to the outer ends of the spokes 56 are the arcuate segmental belt contacting shoes 61 having the outer peripheral surfaces 62 which roll in contact with the outer face 14 of the belt 10. A tension spring 64, FIG. 2, is interconnected between the point 65 on the timing wheel frame 53 and the point 66 on the frame 15 of the seed planter so as to normally swing the frame arms 53 and timing wheel 50 in the direction of the arrow 67 to maintain the proper rolling contact of the timing wheel on the belt 10. A water supply hose 68, FIG. 4, receiving a supply of water under suitable pressure from a water tank on the towing tractor, not shown, is connected through a suitable packing gland 69 to the hollow shaft 31 to thus keep at all times a supply of water in the water manifold compartment 28 of the water distributing wheel 24 during the operation of the device. In certain instances it may be desirable to provide back fill blades 70 fixed to the axially facing edges 71 of the rims 33 and 34 of the water distributing wheel which are adapted to crumple and knock soil over the planted and watered materials presented in the planting cavities 19 to facilitate germination and sprouting of the plants. The back fill blades project radially outwardly of the rims 33 and 34 and are axially spaced each side of the discharge ends 40 of the valve 38.

The timing wheel 50 is connected to drive the water distributing wheel 24 in timed relationship with the planting fingers 13 on the belt 10 by means of an endless roller chain 72, FIG. 2, which operates over a sprocket 73 fixed to the hollow shaft 31, FIG. 4, of the water distributing wheel 24 over a sprocket 74, FIG. 6, fixed on the timing wheel shaft 51, and over an idler sprocket 75 journaled on a stub shaft 76 fixed to the right hand side of timing wheel frame arm 53. By this arrangement the discharge ends 40 of the valves 38 are always properly oriented with the planting cavities 19 formed by the planter fingers 13 as the apparatus moves in the direction of the arrow 77 along a plant row to be treated.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A watering apparatus for a seed planter having:
   (a) an endless planter belt operating over a pair of horizontally spaced pulleys,
   (b) planting fingers projecting outwardly from the outer face of said belt for forming planting cavities in the ground surface,
   (c) and a planter frame journaled on and supporting said pulleys and belt in operative position,
   (d) a watering apparatus for presenting a supply of water in said planting cavities comprising in combination a water distributing wheel frame pivotally mounted on said planter frame,
   (e) a water distributing wheel journaled on said water distributing wheel frame adapted to roll on the ground surface behind said planter,
   (f) a plurality of circumferentially arranged water discharge outlets about the periphery of said water distributing wheel,
   (g) a timing wheel frame pivotally mounted on said water distributing wheel frame so as to swing about the axis of rotation of said water distributing wheel,
   (h) a timing wheel journaled on said timing wheel frame having a peripheral surface adapted to roll in contact with the outer face of said planter belt,
   (i) contact pins spaced circumferentially about the periphery of said timing wheel adapted to engage each side of said planting fingers so that the movement of said planter belt causes timed rotation of said timing wheel relative to said planting fingers,
   (j) and a positively connected power drive transmission between said timing wheel and said water distributing wheel whereby said water discharge outlets are maintained in register with the planting cavities formed by said planting fingers as said planter belt moves forwardly over the ground surface.

2. A watering apparatus for a seed planter having:
   (a) an endless planter belt operating over a pair of horizontally spaced pulleys,
   (b) planting fingers projecting outwardly from the outer face of said belt for forming planting cavities in the ground surface,
   (c) and a planter frame journaled on and supporting said pulleys and belt in operative position,
   (d) a watering apparatus for presenting a supply of water in said planting cavities comprising in combination a water distributing wheel frame pivotally mounted on said planter frame,
   (e) a water distributing wheel journaled on said frame adapted to roll on the ground surface behind said planter,
   (f) a plurality of circumferentially arranged water discharge outlets about the periphery of said water distributing wheel,
   (g) a timing wheel frame pivotally mounted on said water distributing wheel frame so as to swing about the axis of rotation of said water distributing wheel,
   (h) a timing wheel journaled on said turning wheel frame having a peripheral surface adapted to roll in contact with the outer face of said planter belt,
   (i) contact pins spaced circumferentially about the periphery of said timing wheel adapted to engage each side of said planting fingers so that the movement of said planter belt causes timed rotation of said timing wheel relative to said planting fingers,
   (j) a positively connected power drive transmission between said timing wheel and said water distributing wheel whereby said water discharge outlets are maintained in register with the planting cavities formed by said planting fingers as said planter belt moves forwardly over the ground surface,
   (k) and yielding tension means interconnected between said timing wheel frame and said planter frame to normally hold said timing wheel in rolling operative contact with the outer face and planting fingers of said planter belt.

3. A watering apparatus for a seed planter having:
   (a) an endless planter belt operating over a pair of horizontally spaced pulleys,
   (b) planting fingers projecting outwardly from outer face of said belt for forming planting cavities in the ground surface,
   (c) and a planter frame journaled on and supporting said pulleys and belt in operative position,
   (d) a watering apparatus for presenting a supply of water in said planting cavities comprising in combination a water distributing wheel frame pivotally mounted on said planter frame,
   (e) a water distributing wheel journaled on said frame adapted to roll on the ground surface behind said planter,
   (f) a plurality of circumferentially arranged water discharge outlets about the periphery of said water distributing wheel,
   (g) a timing wheel on said water distributing frame adapted to be driven from the planting fingers on said planter belt,
   (h) power transmission means between said timing wheel and said water distributing wheel so that rotation of said timing wheel during the movement of said planter belt causes rotation of said water distributing wheel to maintain said water discharge outlets in register with the planting cavities formed by said planting fingers,
   (i) and back fill blades fixed to and projecting radially outwardly from the periphery of said water distributing wheel and laterally spaced each side of said water discharge outlets so as to back fill soil over seed and materials initially planted in said planting cavities by said planting fingers.

References Cited in the file of this patent

UNITED STATES PATENTS

| | | |
|---|---|---|
| 463,190 | Gunderson | Nov. 17, 1891 |
| 1,085,223 | Riemenschneider | Jan. 27, 1914 |
| 3,103,186 | Saifuku | Sept. 10, 1963 |